United States Patent [19]

Wenzel

[11] 3,736,536

[45] May 29, 1973

[54] MICROWAVE FILTER

[75] Inventor: Robert J. Wenzel, Woodland Hills, Calif.

[73] Assignee: The Bendix Corporation, Southfield, Mich.

[22] Filed: Apr. 14, 1971

[21] Appl. No.: 133,926

[52] U.S. Cl. ..............333/73 R, 333/73 S, 333/84 M
[51] Int. Cl.............................H03h 7/04, H01p 3/08
[58] Field of Search ...................333/70, 73 C, 73 W, 333/84 M, 10, 31, 17, 76

[56] References Cited

UNITED STATES PATENTS

| | | | |
|---|---|---|---|
| 3,546,636 | 12/1970 | Di Piazza | 333/84 M |
| 3,265,994 | 8/1966 | Bruene | 333/17 |
| 3,593,208 | 7/1971 | Smith | 333/10 |
| 3,581,250 | 5/1971 | Eichert | 333/31 |
| 3,617,954 | 11/1971 | Levy et al. | 333/73 |
| 3,644,850 | 2/1972 | Ho | 333/84 M X |
| 3,408,599 | 10/1968 | Horton et al. | 333/73 |

*Primary Examiner*—Rudolph V. Rolinec
*Assistant Examiner*—Marvin Nussbaum
*Attorney*—Lester L. Hallacher and Plante, Hartz, Smith & Thompson

[57] ABSTRACT

The inventive microwave filter is based upon the utilization of a prototype filter of known type, and a recognition of the properties of microwave C-sections, and parallel coupled line capacitance arrays. A prior art filter is chosen as a prototype filter and is partitioned into a general equivalent circuit derived by applying electrical constraints to the standard equivalent circuits for microwave C-sections and parallel coupled line capacitance arrays. A set of general equations is then written for the equivalent circuit, and by using the equations it is possible to design filters having a wide range of desired filter characteristics simply by substituting the values from the prototype filter into the equations. It is therefore possible to construct a wide variety of filters from a few standard parts. Strip line filters can also be made utilizing the general equations.

18 Claims, 16 Drawing Figures

MICROWAVE C-SECTION

STATIC CAPACITANCE NETWORK

S-PLANE EQUIVALENT CIRCUIT

PARALLEL LINE CAPACITANCE ARRAY

STATIC CAPACITANCE NETWORK

S-PLANE EQUIVALENT CIRCUIT

SAAL PROTOTYPE

INVENTOR
ROBERT J. WENZEL

BY [signature]
ATTORNEY

SAAL PROTOTYPE AFTER APPLICATION OF CONSTRAINTS AND EQUALITIES

INVENTOR

ROBERT J. WENZEL

BY [signature]

ATTORNEY

MICROWAVE FILTER

BACKGROUND OF THE INVENTION

Various approaches are available in the art for microwave filter design. Many of these approaches depend on a microwave approximation to a low frequency lumped element prototype. A microwave filter design based on such an approach only approximates the theoretical response of the low frequency prototype. Since the advent of Richard's frequency transform, improved filter design techniques have been available and several microwave filters have been designed using this frequency transform. This transform permits microwave filters to be designed so that their response is exactly, as opposed to approximately for the lumped element technique, determined in advance in the same manner as that of low frequency filters. The inventive filter is such a design, whereupon a convenient fabrication is obtained for a microwave filter that can include poles of attenuation at finite frequencies in the stopband. The cutoff frequency of a low pass version of this design is easily changed by varying only the equal length of microwave conductive lines that comprise the filter, whereas the cross-section of the lines remains invariant. There have previously existed few, if any, convenient designs for microwave filters having wide stopbands which include attenuation poles at finite frequencies.

SUMMARY OF THE INVENTION

The invention provides a filter which can be constructed from a small number of standard cross-sectional parts which can be kept in stock and made readily available. The inventive filter is very compact compared to existing filters having comparable selectivity and dissipation loss.

The invention is based upon a recognition of the electrical characteristics and equivalent networks of microwave C-sections and parallel capacitance arrays and combines these two types of arrays into an equivalent circuit. The equivalent circuit is obtained by partitioning of the equivalent circuit of a prototype filter, which may include attenuation poles in the stopband, into two parallel networks, each of which can be realized by an array of equal-length microwave elements. These two arrays are referred to as microwave C-sections and parallel capacitance arrays and are used to write a set of general design equations. A variety of physical configurations can be realized by utilizing approximations to the equal length microwave elements.

In particular, the equivalent circuit is developed by recognizing the S-plane equivalent networks for a microwave C-section and a parallel capacitance array and relating them to the S-plane network of the prototype filter. The parallel combination of the two microwave network arrays permits the parameter values of static capacitances or characteristic impedances of the two arrays to be determined in terms of the L and C parameters of the S-plane prototype filter.

One convenient embodiment is obtained by requiring the coupling capacity to be zero and the capacities to ground to be equal in each microwave C-section of the array. The uncoupled symmetrical microwave C-sections and the coupled parallel line capacitance array are then combined in parallel to form the equivalent circuit. By using these constraints, equations which relate the microwave circuit parameters, such as static capacitances and characteristic impedances, to element values in the equivalent lowpass prototype network can be written. The prototype filter can have a wide variety of passband or stopband characteristics.

A convenient starting point for obtaining element values for the inventive filter is the use of Saal's tables, design details for which can be found in R. Saal, "The Design of Filters Using the Catalog of Normalized Low-Pass Filters," Backnang/Wurttenberg, West Germany: Telefunken, G.M.B.H., 1961. These tables give prototype element values for the elliptic function filter, a special but often used case of equal ripple in both the passband and stopband. Direct calculation of the microwave parameters for the constrained symmetrical uncoupled microwave C-section realization of the inventive filter can be made through the design equations in terms of entries from Saal's tables.

Other methods can be used to obtain element values for other types of filter responses. For example, it is often convenient to use element values for which prescribed stopband characteristics will result. These element values, when used in the design equations, will result in microwave parameters for the constrained C-section realization for which the inventive filter will produce the desired response.

The inventive filter may also be constrained in any of several ways other than those resulting in the design equations presented hereinafter. For example, in some cases a prescribed amount of coupling in each of the microwave C-sections may be desirable. This constraint will result in design equations which are readily developed from the S-plane network equivalence between the prototype and the parallel combination of microwave C-section and parallel capacitance array. However, these design equations will differ from those developed when coupling is constrained to zero, and usually will be more complex.

Figure 1:
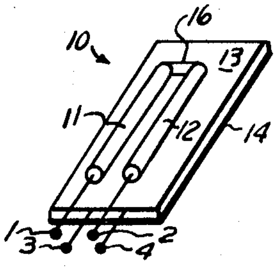
FIG. 1 shows a microwave C-section of the type known in the art.

FIGS. *1a* and *1b*, respectively, show the equivalent circuits for the static capacitance network and S-plane equivalent circuits of the microwave C-section shown in FIG. 1.

Figure 2:
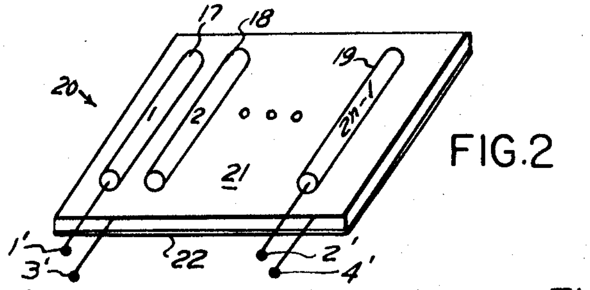
Figure 2A:
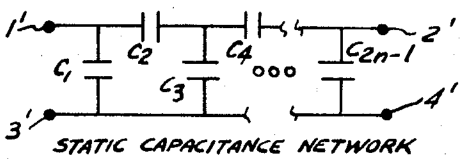
Figure 2B:
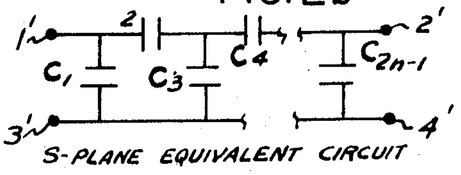

FIG. 2 shows an array of parallel line capacitances.

FIGS. *2a* and *2b*, respectively, show the static capacitance and S-plane equivalent networks for the parallel capacitance array of FIG. 2.

Figure 3:
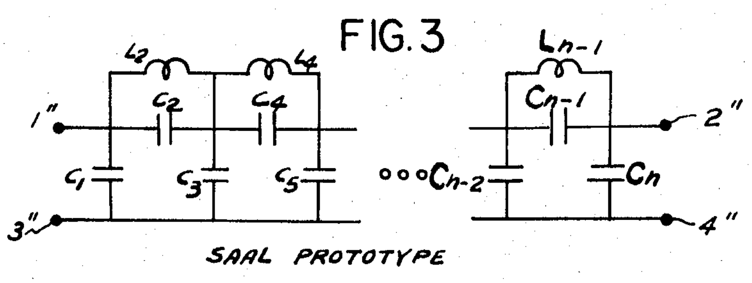

FIG. 3 shows a typical lowpass prototype equivalent circuit of a filter having multiple frequency attenuation poles.

FIGS. *4a* and *4b* show how the lowpass prototype circuit of FIG. 3 is equivalent to a partitioned circuit composed of microwave C-sections and parallel line capacitance arrays.

Figure 5:
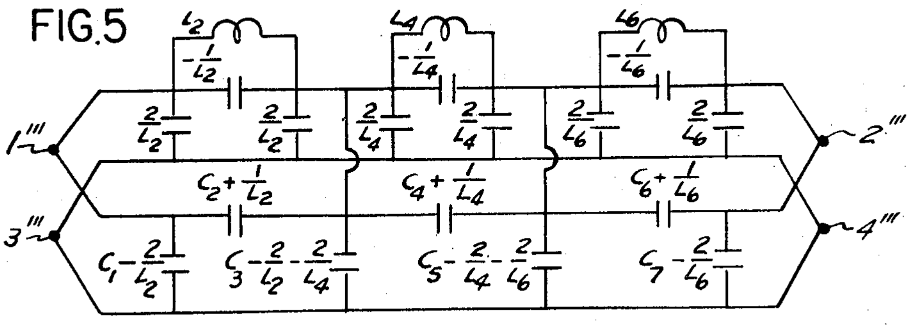

FIG. 5 shows an equivalent circuit wherein the microwave C-section has been held to the constraints defined by equations *6a*, *6b*, and *6c*.

Figure 6:
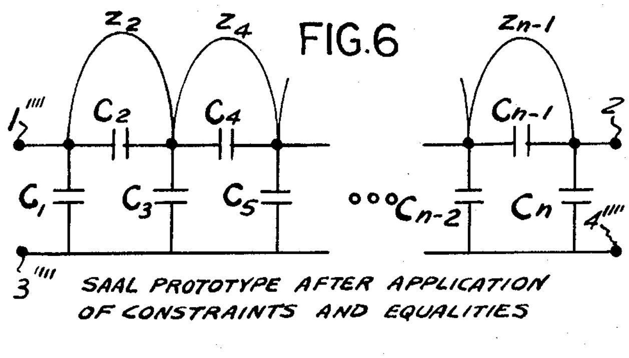

FIG. 6 shows an equivalent circuit developed by combining the equivalent circuits of FIGS. *1b* and *2b* and applying the electrical constraints for symmetrical uncoupled microwave C-sections.

Figure 7:
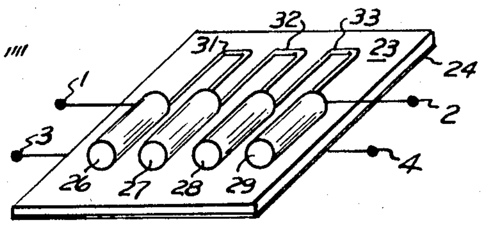

FIG. 7 is a pictorial representation of an elliptic-function filter designed in accordance with one of the special constraints defined in the invention.

Figures 8, 9, 10, 11:
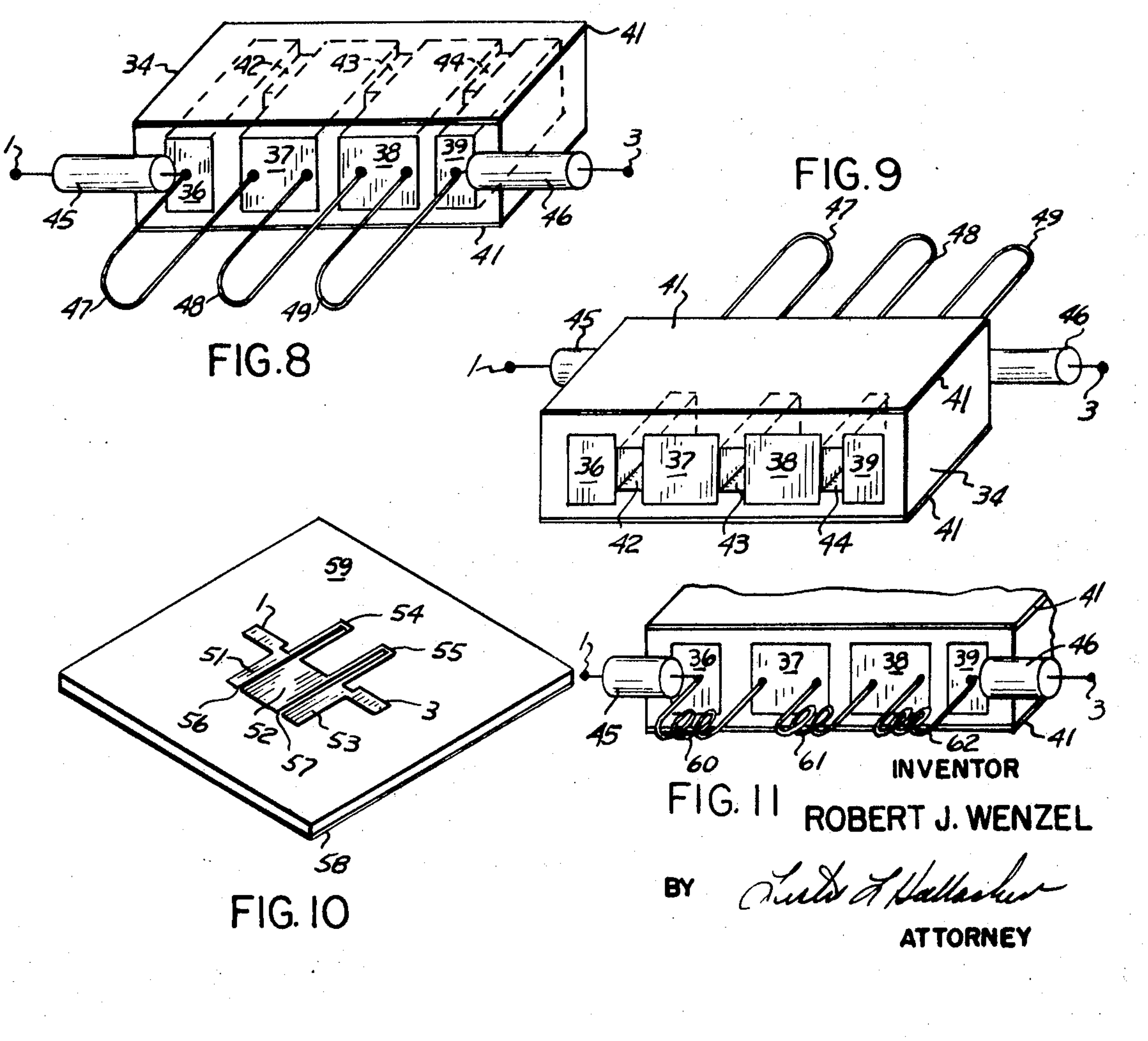

FIG. 8 is a front view of a preferred embodiment of the inventive filter as constrained by the symmetrical uncoupled microwave C-section.

FIG. 9 is a rear view of the preferred embodiment shown in FIG. 8.

FIG. 10 is a preferred embodiment of a stripline version of the inventive filter.

FIG. 11 is a preferred embodiment of the inventive filter wherein the microwave C-sections are approximated with coiled wires.

DETAILED DESCRIPTION

FIG. 1 shows a microwave C-section of a type known in the art.

The microwave C-section includes two conductive elements 11 and 12 of known type, and can be formed of brass rods, for example. The cross-sectional dimensions of the two line conductors 11 and 12 are determinative of the static capacitances of the conductors. Accordingly, elements having dimensions consistent with the required static capacitances may be obtained by referring to charts given in W. J. Getsinger, "Coupled Rectangular Bars Between Parallel Plates," *IRE Transactions on Microwave Theory and Techniques*, July 1964, pp. 428–439.

Conductive elements 11 and 12 are mounted on a dielectric plane 13 and are fed against a ground plane 14 so that the electrical properties of each of the sections is determined by the dielectric constant of plane 13 and also by the physical dimensions of the elements. The structure is usually fabricated in a symmetrical manner so that dielectric and ground planes identical to dielectric plane 13 and ground plane 14 are placed above rods 11 and 12. The two conductive elements 11 and 12 form a microwave C-section, because they are shorted together at one end by an end strap 16. Conductive sections 11 and 12 are coupled in that there is a capacitance between the two elements. The coupling can be varied by changing the distance between the two elements and also by changing the configuration of the two conductive elements 11 and 12. As an example, the coupling can be increased by configuring the elements to be square in cross-section.

Microwave C-section 10 has two input terminals 1 and 3 and two output terminals 2 and 4. For convenience throughout the specification, the same but primed numbers are used to show the corresponding input and output terminals of the various circuits.

Figure 1A:
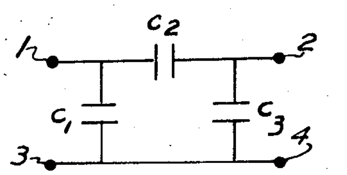

FIG. 1a shows a static capacitance network which is used to describe the microwave C-section shown in FIG. 1. Accordingly, input terminals 1 and 3 and output terminals 2 and 4 are similarly numbered. The static capacitance network includes two capacitors $c_1$ and $c_3$. These capacitors are respectively equivalent to the static capacitance of conductive sections 11 and 12 of FIG. 1 to the ground plane 14 of FIG. 1. Ground plane 14 of FIG. 1 is equivalent to the line connecting terminals 3 and 4 of FIG. 1*a*. Capacitor $c_2$ of FIG. 1a is the static coupling capacity which exists between conductive elements 11 and 12 of FIG. 1.

Figure 1B:
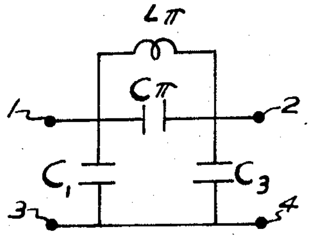

The static capacitances ($c_1$, $c_2$, and $c_3$) associated with the line geometry of microwave C-section 10 can be related to S-plane elements ($C_1$, $C_\pi$, $C_3$, and $L_\pi$) as follows:

$$\sqrt{\epsilon_r} Z_0/\eta_0\, c_1 = C_1 = -\,(1 + c_1/c_3)\, C_\pi \qquad \text{1a}$$

or $$\sqrt{\epsilon_r} Z_0/\eta_0\, c_3 = C_3 = -\,(1 + C_3/c_1)\, C_\pi \qquad \text{1b}$$

$$\sqrt{\epsilon_r} Z_0/\eta_0\, c_2 = C\pi + 1/L_\pi \qquad \text{1c}$$

where:

$\epsilon_r$ = the relative dielectric constant of the medium from which dielectric plane 13 of FIG. 1 is formed $Z_0$ = the terminating characteristic impedance of the network into which the C-section is imbedded $\eta_0$ = the impedance of free space = 376.7 ohms FIG. 1*b* shows the S-plane equivalent circuit of the microwave C-section shown in FIG. 1. The large C's and L's represent the S-plane equivalents of the elements of microwave C-section 10 which are obtained by use of Richards' transform. This transform is found in P. I. Richards' "Resistor Transmission Line Circuits," *Proceedings of the IRE*, Vol. 36, Feb. 1948, pp. 217–220. The subscripts used in the equivalent circuit of FIG. 1*b* are the same as those of FIG. 1*a* to indicate the equivalence of the various elements contained within the two equivalent circuits.

The S-plane equivalent circuit of FIG. 1b can be used to describe the frequency behavior of the microwave C-section. The inductances and capacitances for this circuit, given in terms of the static capacitances, are as follows:

$$L_\pi = \eta_0/(\sqrt{\epsilon_r}\, Z_0)\ ((c_1 + c_3)/(c_1 c_2 + c_2 c_3 + c_3 c_1)) \qquad \text{2a}$$

$$C_\pi = -\sqrt{\epsilon_r} Z_0/\eta_0\ (c_1 c_3)/(c_1 + c_3) \qquad \text{2b}$$

$$1/C_1 + 1/C_3 + 1/C_\pi = 0 \qquad \text{2c}$$

where:

$L_\pi$ = the coupling inductance between the two line conductors 11 and 12 of FIG. 1 when connected by end strap 16

$C_\pi$ = the coupling capacitance between the two line conductors 11 and 12 of FIG. 1 when connected by end strap 16

Equations 2*b* and 2*c* require that capacitance $C_\pi$ be a negative S-plane capacitance consistent with the electrical performance of microwave C-sections.

Various constraints can be imposed on the microwave C-section to result in different geometries convenient to the designer. One such constraint gives rise to the symmetrical uncoupled C-section. In the equivalent circuits shown in FIGS. 1*a* and 1*b*, the constraint requires that $C_1 = C_3$ for symmetry, and that the static capacitance $c_2$ which represents the coupling between capacitive lines 11 and 12 be zero:

$$\sqrt{\epsilon_r} Z_0/\eta_0\, c_2 = C_\pi + 1/L_\pi = 0 \qquad \text{3a}$$

$$C_{\pi} = -1/L_{\pi} \quad (3b)$$

FIG. 2 shows a parallel line capacitance array 20 of a type known in the art. In this array a plurality of line capacitive elements 17, 18, and 19 are physically applied to a dielectric plane 21 so that they are electrically fed against a ground plane 22 creating a capacitance between each of the individual elements. In actual fabrication, a symmetrical structure is usually built by providing an additional dielectric plane and ground plane, respectively, identical to dielectric plane 21 and ground plane 22 above the plurality of elements 17, 18, and 19. Coupling exists between all adjacent elements and is assumed to not exist between elements not immediately adjacent one another.

The equivalent circuit of the static capacitance network of FIG. 2 is shown in FIG. *2a*. In FIG. *2a* capacitors $C_1$, $C_3$ to $C_{2n-1}$, that is—all odd-numbered capacitors, represent the capacitances formed by the individual line capacitors 17 through 19 and ground plane 22, while capacitances $C_2$, $C_4$, $C_{2n}$, that is—all even-numbered capacitors, represent the coupling capacitances existing between the individual elements.

Capacitors $c_i$ and $C_i$, for $i = 1$ to 2n-1, are related by $$\sqrt{\epsilon_r} Z_0/\eta_0 \, c_i = C_i \quad (4)$$

where the capitalized C's are the S-plane capacitors which describe frequency behavior of the microwave C-sections.

FIG. 3 shows a lowpass prototype filter which may include real frequency attenuation poles in the stopband. A variety of passband and stopband characteristics can be achieved with the network of FIG. 3 serving as a prototype. It is often desired to obtain equal ripple passband characteristics, in which case it is necessary to select the prototype cutoff frequency as well as the frequency for which the capacitive elements are a quarter-wavelength long. The prototype cutoff frequency $\Omega_c$ is defined as $$\Omega_c = \tan(\pi f_c/2f_o) \quad (5)$$

where:

$f_c$ = actual cutoff frequency $f_o$ = frequency for which lines are quarter-wave long The parameter $\Omega_c$ determines the length of the capacitive elements and is chosen to be a fraction of a wavelength at the cutoff frequency $f_c$ of the filter for lowpass applications.

After the selection of the desired filter characteristics, lowpass prototype element values can be found in tables or through synthesis procedures which will yield the desired characteristics in both the passband and stopband and which will define the capacitances $C_1$, $C_2$, $C_n$ of the lowpass prototype of FIG. 3.

Figure 4A:
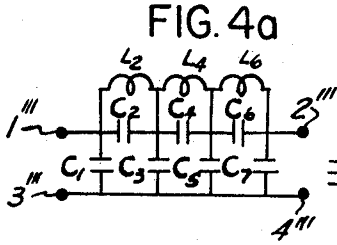
Figure 4B:
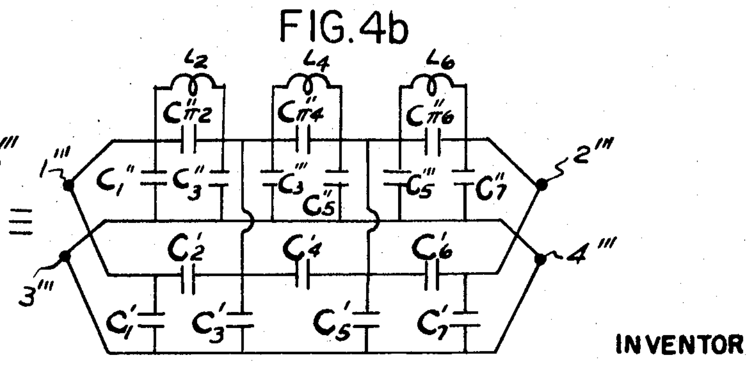

The first step in relating the lowpass prototype of FIG. 3 to the unique and simplified filter described by the invention is the partitioning of the prototype into an equivalent circuit in the manner shown in FIG. 4. In FIG. 4 the left portion of the equivalence, indicated as FIG. *4a*, is identical to the lowpass prototype of FIG. 3 for the case of $n = 7$. The equivalence of FIGS. *4a* and *4b* is obtained by considering the seven-branch lowpass prototype of FIG. *4a* as being a parallel type connection of two networks, one of which is identified with a cascade of microwave C-sections of the type shown in FIG. 1, and the other with a parallel line capacitance array of the type shown in FIG. 2. The circuit of FIG. *4b* is obtained from that of FIG. *4a* by partitioning, or dividing, each element of the lowpass prototype into the required number of components dictated by the circuit of FIG. *4b*. The equivalence between the two circuits of FIGS. *4a* and *4b* is exact so long as each prototype capacitor is equal to the sum of the capacitors into which it was partitioned, that is $C_1 = C_1' + C_1''$ $C_2 = C_2' + C_{\pi 2}''$ $C_3 = C_3' + C_3'' + C_3'''$ etc.

It is now apparent that a large number of equivalent circuits is available, depending upon the large number of available ways of partitioning the lowpass prototype of FIG. *4a*. This partitioning allows the exact realization of the lowpass prototype in terms of practical existing microwave structures, i.e., microwave C-sections and parallel capacitive coupled arrays.

The partitioned lowpass prototype of FIG. *4b* can now be seen as being comprised of a parallel type of connection of a cascade of microwave C-section circuits as shown in FIG. *1b* and a parallel line capacitance array as shown in FIG. *2b*.

In FIG. *4b* both the microwave C-section cascade equivalent portion and the portion equivalent to the parallel line capacitance array, extend between terminals 1''', 3''' on the left and 2''', 4''' on the right.

A special case in which each of the microwave C-sections becomes uncoupled, results from applying the equality of equation *3b* to the values of the components shown in FIG. *4b*. By further requiring that $C_1'' = C_3''$, $C_3''' = C_5''$, $C_5''' = C_7''$ in FIG. *4b*, the equivalent partitioned circuit shown in FIG. 5 is obtained. The circuit of FIG. 5 therefore is equivalent to that of FIG. 3 after the proper partitioning in accordance with the equality $C_k = C_k' + C_k'' + C_k'''$ for $k = 1$ to n and by requiring that $C_1 = C_3$ (of the S-plane equivalent circuit for the C-sections of FIG. *1b*), and $C_{\pi} = -1/L_{\pi}$ FIG. 6 is equivalent to FIG. 5 based on the parallel type connection of a cascade of symmetrical uncoupled microwave C-sections having equivalent circuits given in FIG. 1 and the parallel capacitance equivalent circuit of FIG. 2. The equivalent circuit of FIG. 6, which is consistent with all the defined constraints, then permits the writing of design equations for the filter containing symmetrical uncoupled C-sections as follows:

$$c_{2k-1} = \frac{\eta_0}{\sqrt{\epsilon_r} Z_0}\left[\frac{C_{2k-1}}{\Omega_c} - 2\Omega_c\left(\frac{1}{L_{2k-2}} + \frac{1}{L_{2k}}\right)\right] \text{ for } k=1 \text{ to } \frac{n+1}{2} \quad (6a)$$

$$c_{2k} = \frac{\eta_0}{\sqrt{\epsilon_r} Z_0}\left[\frac{C_{2k}}{\Omega_c} + \frac{\Omega_c}{L_{2k}}\right] \text{ for } k=1 \text{ to } \frac{n-1}{2} \quad (6b)$$

$$Z_{2k} = \frac{Z_0 L_{2k}}{2\Omega_c} \text{ for } k=1 \text{ to } \frac{n-1}{2} \quad (6c)$$

where:

$Z_0$ = source and termination impedance, $\eta_0$ = 376.7 ohms (for free space)

$\epsilon_r$ = relative dielectric constant of coupling medium $C_{2k}$ and $C_{2k-1}$ are static capacitors from which physical dimensions can be found $Z_{2k}$ = C-section loop characteristic impedances $C_k$ = capacitance of the prototype filter $L_k$ = inductance of the prototype filter Equations *6a*, *6b*, and *6c* therefore define the static capacitance values for the microwave elements of a filter operational with the characteristics selected in accordance with $\Omega_c$ and its defining frequencies. In equations *6a*, *6b*, and 6*c* the value of $\eta_0$ is defined as that of free space.

Because all cross-sectional dimensions are invariant with cutoff frequency, it is possible to design filters having a wide variety of cutoff frequencies from a small number of available standard components by simply changing the length of all elements by an equal amount.

FIG. 7 shows a filter which is designed in accordance with the inventive concept. The filter includes a dielectric support plane 23 which supports an array of parallel line capacitive elements 26 through 29 against a ground plane 24. In fabrication, a symmetrical structure would usually be employed having a dielectric support plane 23 and ground plane 24 located also above the capacitive elements 26 through 29. The capacitive elements are connected by way of loops 31 through 33. In comparing the filter of FIG. 7 with the equivalent circuit shown in FIG. 6 and the particular design equations defined by equations 6*a* through 6*c*, the physical dimensions and configuration of elements 26 through 29, as well as the spacing of these elements from ground plane 24 are determined by both the even- and odd-numbered capacitances of FIG. 6. It should be noted that the even-numbered capacitances of FIG. 6 are assumed to determine line capacitances in FIG. 7 for which coupling occurs only between elements which are immediately adjacent; that is, line 27 is assumed to be coupled only to line 26 and 28 but not to 29. The loops 31 through 33 in FIG. 7 are uncoupled and have characteristic impedances given by the Z values in FIG. 6.

A filter designed consistent with the inventive concepts, and which incorporates the special constraint of symmetrical uncoupled C-sections, and which is a commercially feasible filter is shown in FIG. 8. A dielectric support 34, which can be made from teflon or some other convenient dielectric material, supports a plurality of parallel line capacitances 36, 37, 38, and 39 between two ground planes 41. The parallel line capacitances 36 through 39 are shown to be rectangular in cross-sectional configuration in order to provide sufficient coupling capacitance between the elements. If desired, other cross-sectional configurations can be used. The individual parallel line capacitances are maintained at a spacing which is consistent with the coupling capacitance required for the particular design characteristics as shown in the equations 6*a*, 6*b*, and 6*c*. Accordingly, the dielectric exists between a substantial portion of the parallel line capacitances. However, if necessary or desirable, some of the dielectric can be removed from between the capacitances as indicated by the spacings 42, 43, and 44. Spaces 42 to 44 can be used to tailor the coupling capacitance in accordance with the design equations. The insertion of dielectric shims into spaces 42 to 44 can be used to fine-tune the stopband transmission zeros. The active input terminal 1 and output terminal 3 are respectively connected to capacitors 36 and 39 by means of conductive members 45 and 46 which may be cylindrical, rectangular, or of other cross-section. Wire loops 47, 48, and 49 serially connect the parallel line capacitances 36 to 39. Loops 47, 48, and 49 are arranged such that they are parallel to ground plane 41 and are configured and designed in accordance with the constraints recited hereinabove so that they have zero coupling and each side of the individual loops have equal capacitances.

FIG. 9 shows the embodiment of FIG. 8 after the showing of FIG. 8 has been rotated 180° about the line extending between terminals 1 and 3. This figure is useful in showing that slots 42, 43, and 44 may be incorporated along a portion of the length of the parallel capacitances 36 through 39 for fine tuning of the filter.

A stripline embodiment of the inventive filter is shown in FIG. 10. This embodiment includes three parallel line capacitances 51, 52, and 53. The coupling spaces between the parallel line capacitors are represented as 56 and 57. The width of these spaces is selected to determine the required coupling capacitance between the line capacitances consistent with the teachings of the invention. Conductive elements 54 and 55 connect the parallel line capacitances and form the impedance loops shown in FIGS. 6 and 7. The gaps between conductive elements 54, for example, need not be the same as the gap 56 between parallel line capacitors 51 and 52. The active input and output terminals 1 and 3, respectively, are also included in the stripline version of the circuit.

The dielectric base 59 supports the filter elements from a ground plane 58 so that the thickness of the dielectric material is instrumental in determining these capacitive values of parallel line capacitors 51, 52, and 53. Dielectric base 59 can be made from polyolefin, polytetrafluorethalene, polystyrene, or some other useful microwave dielectric material.

The stripline embodiment of the filter can be fabricated by depositing copper or some other conductive material upon the dielectric base 59 by the use of printed circuit or similar type of techniques in a known manner. It will be appreciated that ground plane 58 can also be deposited upon the dielectric support 59 in a similar manner. If desired or necessary for physical or electrical reasons, a second dielectric layer can be superimposed on top of the printed filter configuration.

FIG. 11 is a broken-away showing of the embodiment of FIG. 8 in which the wire loops 47, 48, and 49 of FIG. 8 have been replaced by the coiled wires 60, 61, and 62. The coiled wires form lumped inductances which can be made to approximate microwave C-sections for wide bandstop and lowpass applications. This approximation is especially useful at lower frequencies.

The inventive filter is seen to have bar-line embodiments and strip-line embodiments consistent with the inventive concepts presented hereinabove. It should be noted that, although in the design equations and the embodiments described the loop coupling is constrained to be zero, this is a practical technique but is not essential. Appreciable coupling can exist between the loops of the microwave C-sections. However, when such coupling does exist the other capacitances within the filter must be tailored in accordance with the teachings of the invention so that the desired filter characteristics are achieved. It should especially be noted that if desired a new set of equations can be written wherein the loop coupling is not constrained to be zero.

In theory, the filter described hereinabove is a bandstop filter having a stopband centered around the frequency at which the line elements are a quarter-wavelength. By choosing $\Omega_c$ to be small, a lowpass characteristic in a practical, physical structure is easily obtainable. Wide bandstop characteristics are also easy to achieve in the same and similar physical structures. By using the higher order passband, it is also practical to achieve relatively narrow bandpass filter characteristics using a similar physical structure.

What is claimed is:

1. A microwave filter comprising:

a parallel line capacitance array the number of individual line sections within said parallel line capacitance array being defined as *n*;

a microwave C-section array the number of microwave C-sections being defined as $n-1$ said parallel line capacitance array and said C-section array being connected in parallel.

2. The filter of claim 1 wherein the coupling capacitance of said microwave C-sections is substantially zero; and the capacitances with respect to ground of the individual elements composing each of said C-sections are equal.

3. A microwave filter comprising:

a plurality of conductive elements having individual capacitance values dependent upon the individual dimensions of said conductive elements;

a ground plane;

dielectric means for maintaining said conductive elements in a spaced substantially parallel relationship and supporting said conductive elements above said ground plane so that said conductive elements form a parallel line capacitance array;

a plurality of reactance means serially connecting one end of said conductive elements and extending substantially parallel to said ground plane.

4. The filter of claim 3 wherein said conductive elements are conductive three-dimensional elements having individual capacitance values dependent upon the individual dimensions of said conductive elements.

5. The filter of claim 5 wherein said reactance means are microwave C-sections and wherein said conductive elements and said microwave C-sections are substantially two dimensional members supported by said dielectric means.

6. The filter of claim 3 wherein said reactance means are conductive loops the ends of which are connected to adjacent conductive elements.

7. The filter of claim 3 wherein said reactance means are lumped inductances.

8. The filter of claim 6 wherein said reactance means are microwave C-sections and the coupling capacitance of said microwave C-sections is substantially zero; and the capacitances with respect to ground of the individual elements composing each of said C-sections are equal.

9. The filter of claim 5 wherein the coupling capacitance of said microwave C-sections is substantially zero; and the capacitances with respect to ground of the individual elements composing each of said C-sections are equal.

10. The filter of claim 5 wherein said filter is designed in accordance with the expressions:

$$c_{2k-1}=\frac{\eta_o}{\sqrt{\epsilon_r}Z_o}\left[\frac{C_{2k-1}}{\Omega_c}-2\Omega_c\left(\frac{1}{L_{2k-2}}+\frac{1}{L_{2k}}\right)\right];\ k=1\,TO\,\frac{n+1}{2}$$

$$c_{2k}=\frac{\eta_o}{\sqrt{\epsilon_r}Z_o}\left[\frac{C_{2k}}{\Omega_c}+\frac{\Omega_c}{L_{2k}}\right];\ k=1\,TO\,\frac{n-1}{2}$$

$$Z_{2k}=\frac{Z_oL_{2k}}{2\Omega_c};\ k=1\,TO\,\frac{n-1}{2}$$

where:

$\eta_o$ = impedance of free space $Z_o$ = termination impedance $\epsilon_r$ = relative dielectric constant of coupling medium $f_c$ = cutoff frequency $f_o$ = frequency at which lines are quarter-wave long $\Omega = \tan \pi f_c/2f_o$ $C_k$ = capacitance of the prototype filter $L_k$ = inductance of the prototype filter $c_k$ = static capacitance of the parallel conductor array $Z_{2k}$ = characteristic impedance of the inductive loops

11. A method of making a microwave filter including the steps of:

arranging a quantity of n line capacitances into a parallel line array;

connecting a quantity of $n-1$ reactance means to said parallel line array so that said parallel line array and said quantity are in an electrical parallel relationship.

12. The method of claim 11 further including the steps of:

utilizing microwave C-sections as said reactance means and designing said microwave C-sections so that the coupling capacity of each of said microwave C-sections is zero;

and selecting individual line capacitances for each of said C-sections so that line capacitances of each C-section are equal.

13. The method of claim 11 further including the step of:

selecting the elements of said filter in accordance with the equations:

$$c_{2k-1}=\frac{\eta_o}{\sqrt{\epsilon_r}Z_o}\left[\frac{C_{2k-1}}{\Omega_c}-2\Omega_c\left(\frac{1}{L_{2k-2}}+\frac{1}{L_{2k}}\right)\right];\ k=1\,TO\,\frac{n+1}{2}$$

$$c_{2k}=\frac{\eta_o}{\sqrt{\epsilon_r}Z_o}\left[\frac{C_{2k}}{\Omega_c}+\frac{\Omega_c}{L_{2k}}\right];\ k=1\,TO\,\frac{n-1}{2}$$

$$Z_{2k}=\frac{Z_oL_{2k}}{2\Omega_c};\ k=1\,TO\,\frac{n-1}{2}$$

where:

$\eta_o$ = impedance of free space $Z_0$ = termination impedance $\epsilon_r$ = relative dielectric constant of coupling medium $f_c$ = cutoff frequency $f_o$ = frequency at which lines are quarter-wave long $\Omega = \tan \pi f_c/2f_o$ $C_k$ = capacitance of the prototype filter $L_k$ = inductance of the prototype filter $c_k$ = static capacitance of the parallel conductor array $Z_{2k}$= characteristic impedance of the inductive loops

14. The method of claim 11 further including the steps of:

utilizing lumped inductances in the form of coils as said reactance means.

15. The method of claim 12 further including the steps of:

utilizing lumped inductances in the form of coils as said reactance means.

16. A microwave filter comprising:

a parallel line capacitance array;

a microwave C-section array connected in a parallel relationship with said parallel line capacitance array said filter being designed in accordance with the expressions:

$$c_{2k-1}=\frac{\eta_o}{\sqrt{\epsilon_r}Z_o}\left[\frac{C_{2k-1}}{\Omega_c}-2\Omega_c\left(\frac{1}{L_{2k-2}}+\frac{1}{L_{2k}}\right)\right];\ k=1\ TO\ \frac{n+1}{2}$$

$$c_{2k}=\frac{\eta_o}{\sqrt{\epsilon_r}Z_o}\left[\frac{C_{2k}}{\Omega_c}+\frac{\Omega_c}{L_{2k}}\right];\ k=1\ TO\ \frac{n-1}{2}$$

$$Z_{2k}=\frac{Z_oL_{2k}}{2\Omega_c};\ k=1\ TO\ \frac{n-1}{2}$$

where:

$\eta_0$ = impedance of free space $Z_0$ = termination impedance $\epsilon_r$ = relative dielectric constant of coupling medium $f_c$ = cutoff frequency $f_0$ = frequency at which lines are quarter-wave long $\Omega = \tan \pi f_c/2f_0$ $C_k$ = capacitance of the prototype filter $L_k$ = inductance of the prototype filter $c_k$ = static capacitance of the parallel conductor array $Z_{2k}$= characteristic impedance of the inductive loops

17. A microwave filter comprising:

a plurality of conductive elements;

a ground plane;

dielectric means for maintaining said conductive elements in a spaced substantially parallel relationship and supporting said conductive elements above said ground plane so that said conductive elements form a parallel line capacitance array;

a plurality of reactance means serially connecting one end of said conductive elements and extending substantially parallel to said ground plane, said filter being designed in accordance with the expressions:

$$c_{2k-1}=\frac{\eta_o}{\sqrt{\epsilon_r}Z_o}\left[\frac{C_{2k-1}}{\Omega_c}-2\Omega_c\left(\frac{1}{L_{2k-2}}+\frac{1}{L_{2k}}\right)\right];\ k=1\ TO\ \frac{n+1}{2}$$

$$c_{2k}=\frac{\eta_o}{\sqrt{\epsilon_r}Z_o}\left[\frac{C_{2k}}{\Omega_c}+\frac{\Omega_c}{L_{2k}}\right];\ k=1\ TO\ \frac{n-1}{2}$$

$$Z_{2k}=\frac{Z_oL_{2k}}{2\Omega_c};\ k=1\ TO\ \frac{n-1}{2}$$

where:

$\eta_o$ = impedance of free space $Z_o$ = termination impedance $\epsilon_r$ = relative dielectric constant of coupling medium $f_c$ = cutoff frequency $f_o$ = frequency at which lines are quarter-wave long $\Omega = \tan \pi f_c/2f_o$ $C_k$ = capacitance of the prototype filter $L_k$ = inductance of the prototype filter $c_k$ = static capacitance of the parallel conductor array $Z_{2k}$= characteristic impedance of the inductive loops

18. A microwave filter comprising:

a plurality of conductive elements;

a ground plane;

dielectric means for maintaining said conductive elements in a spaced substantially parallel relationship and supporting said conductive elements above said ground plane so that said conductive elements form a parallel line capacitance array;

a plurality of microwave C-sections serially connecting one end of said conductive elements and extending substantially parallel to said ground plane, said filter being designed in accordance with the expressions:

$$c_{2k-1}=\frac{\eta_o}{\sqrt{\epsilon_r}Z_o}\left[\frac{C_{2k-1}}{\Omega_c}-2\Omega_c\left(\frac{1}{L_{2k-2}}+\frac{1}{L_{2k}}\right)\right];\ k=1\ TO\ \frac{n+1}{2}$$

$$c_{2k}=\frac{\eta_o}{\sqrt{\epsilon_r}Z_o}\left[\frac{C_{2k}}{\Omega_c}+\frac{\Omega_c}{L_{2k}}\right];\ k=1\ TO\ \frac{n-1}{2}$$

$$Z_{2k}=\frac{Z_oL_{2k}}{2\Omega_c};\ k=1\ TO\ \frac{n-1}{2}$$

where:

$\eta_o$ = impedance of free space $Z_o$ = termination impedance $\epsilon_r$ = relative dielectric constant of coupling medium $f_c$ = cutoff frequency $f_o$ = frequency at which lines are quarter-wave long $\Omega = \tan \pi f_c/2f_o$ $C_k$ = capacitance of the prototype filter $L_k$ = inductance of the prototype filter $c_k$ = static capacitance of the parallel conductor array $Z_{2k}$= characteristic impedance of the inductive loops

* * * * *